Nov. 27, 1945.        L. M. ODOM ET AL        2,389,633
POT CHUCK COLLET
Filed April 10, 1944
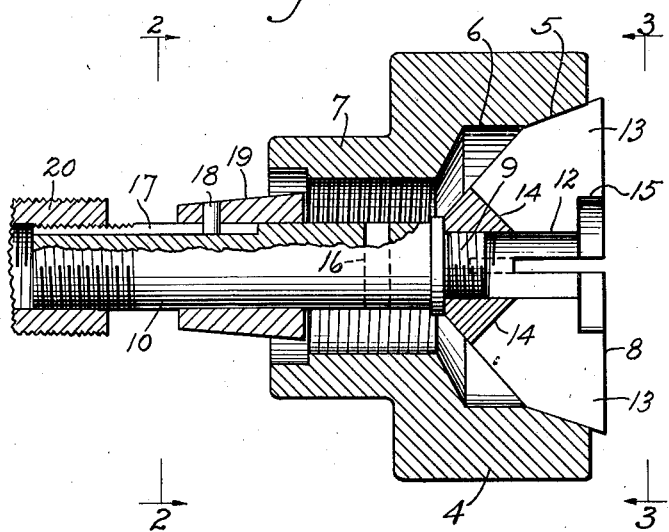
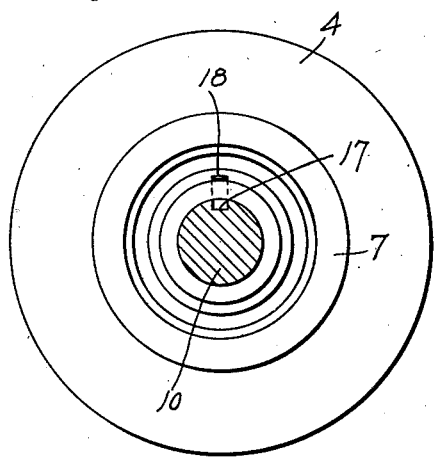
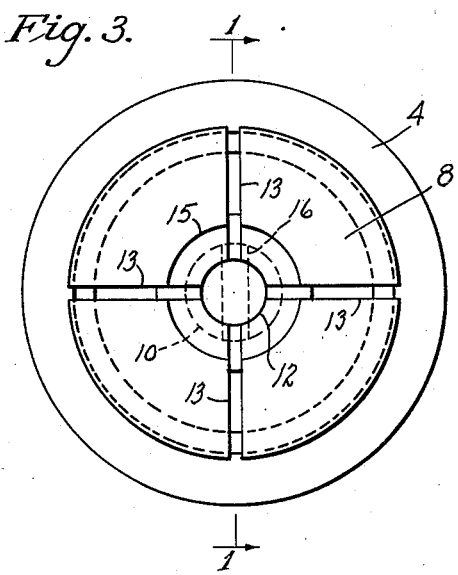
INVENTORS
Leslie M. Odom
& John H. Lambert
BY
Carlos G. Stratton
ATTORNEY Patented Nov. 27, 1945

2,389,633

UNITED STATES PATENT OFFICE 2,389,633

POT CHUCK COLLET

Leslie M. Odom and John H. Lambert,
Los Angeles, Calif.

Application April 10, 1944, Serial No. 530,322

2 Claims. (Cl. 279—51)

Our invention relates to a pot chuck collet, and an important object of the invention is to provide a pot chuck collet that will permit quick insertion and quick removal of work upon which an operation is to be performed, or has been performed.

Another object of the invention is to provide a pot chuck collet in which the work can be changed without stopping the machine that actuates same.

A further object is to provide a pot chuck that is so constructed as to grip a greater proportion of the perimeter of the work, than is possible with tools now in common use.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a longitudinal section, partly in elevation, of an embodiment of the foregoing objects, taken along the line 1—1 of Fig. 3.

Fig. 2 is a section taken on the line 2—2 of Fig. 1.

Fig. 3 is an end elevation, looking in the direction of the arrows 3—3 of Fig. 1.

Referring more in detail to the drawing, the reference number 4 generally designates a chuck closer that is provided with a tapering shoulder 5 and has a cylindrical opening 6 that narrows into an interiorly threaded end 7. The threaded end 7 screws on to the spindle (not shown) of a machine tool, such as a lathe, boring mill, etc.

A pot chuck 8 is screwed upon a threaded, outer end 9 of a shank 10. The pot chuck comprises a concentric bore 12, at the rear end of which is the threaded portion that screws upon the shank 10. The pot chuck has four quadrant slots 13 radiating from the bore 12 and each is cut back to an angle 14. A circular recess 15 is provided in the face of the pot chuck to receive work material to be machined. Of course, the recess 15 may be of any desired diameter within the limits of the pot chuck, but the recess 15 is slightly larger than the diameter of the work.

The shank 10 has a hole 16 in which a pin (not shown) may be inserted in order to hold the shank 10 while unscrewing the pot chuck 8. The shank 10 has a keyway 17 in which rides a pin 18 on a tapered sleeve adapter 19. The adapter 19 is slidable along the shank 10. The interiorly and exteriorly threaded end of a sleeve 20 of a collet closer is screwed upon the rear, threaded end of the shank 10.

In practice our pot chuck closer is attached to the spindle (not shown) of a machine tool, such as a lathe, boring mill, etc., in the place of the ordinary chuck thereon. Such attachment may be by a threaded connection, through the intermediary of the threads in the end 7, or by any other suitable means. The tapered adapter 19 is then inserted through the pot chuck closer into tight fit within the spindle (not shown) of the machine tool. The adapter thereby turns with the spindle of the machine tool. This adapter provides a firm support for the shank 10, so that the latter will run true about its axis. The shank 10 of the pot chuck 8 is thereupon inserted through the adapter 19, with the keyway 17 engaged by the pin 18.

The end 20 of any suitable collet closer is screwed upon the inner end of the pot chuck 8. This connection affords an adjustment to compress the pot chuck 8 within the pot chuck closer, to a greater and lesser degree, depending upon the diameter of the work.

In the operation of our device, the collet closer 20 is moved to the right in Fig. 1, which relieves the pot chuck 8 from the grip of the pot chuck closer 4 thereon. This may be done while the machine is running.

The work may then be fitted in the recess 15 and the collet closer 20 is then drawn to the left in Fig. 1. This movement draws the pot chuck 8 into the pot chuck closer 4, compressing the four portions of the pot chuck in a tight, gripping position around the work, due to the relatively long mutual bearing surfaces of the pot chuck and the pot chuck closer, as suggested at 5. This also may be done while the machine is running.

Then the cutting operation is performed on the work, and by movement of the pot chuck to the right in Fig. 1, the work is released while the machine is still running.

While we have illustrated and described what we now regard as the preferred embodiment of our invention, the construction is, of course, subject to modifications without departing from the spirit and scope of our invention. We, therefore, do not wish to restrict ourselves to the particular form of construction illustrated and described, but desire to avail ourselves of all modifications that may fall within the scope of the appended claims.

Having thus described our invention, what we claim and desire to secure by Letters Patent is:

1. A pot chuck collet comprising in combination with a rotatable machine element, a pot chuck closer having an axial bore threaded for connection with said machine element, said chuck closer having a diametrally enlarged inwardly tapering annular wall, a shank extending through the axial bore of said chuck closer and provided at one end with threads and at the other end with a diametrally larger abutment and a reduced exteriorly threaded portion extending beyond said abutment, said shank having a longitudinal groove extending inwardly from the end thereof to a point intermediate the ends thereof, a pot chuck comprising a body adapted to engage the extended threaded portion of said shank, said body having resilient radial jaws extending outwardly therefrom and provided with faces complementary to said tapering wall, said jaws co-operating to define a central work receiving recess, a conical member adapted to be connected frictionally with said machine element and provided with a cylindrical bore through which said shank extends, said member forming the sole bearing for said shank and provided with a key disposed in the groove of said shank to lock said shank for rotation with said machine element, and a collet closer on the threaded end of said shank to effect movement of said shank and the opening and closing of said jaws.

2. A pot chuck collet comprising in combination with a rotatable machine element, a chuck closer having an axial bore and threaded for connection with said machine element, said closer having a diametrally enlarged tapering wall, a shank extending through and free of the axial bore of said chuck closer and provided with a longitudinal groove, a chuck secured to one end of said shank having radial jaws provided with faces corresponding to the tapering wall of the closer, a cone frictionally connected with said machine element and having a cylindrical bore through which said shank extends and by which it is supported free of said closer, said cone forming the sole support for said shank and provided with a key disposed in the groove of said shank to lock said shank with said cone, and a collet closer on the other end of said shank to effect longitudinal movement thereof and the opening and closing of said jaws.

LESLIE M. ODOM.
JOHN H. LAMBERT.